United States Patent
Coulmeau et al.

(10) Patent No.: US 8,718,933 B2
(45) Date of Patent: May 6, 2014

(54) METHOD FOR AIDING THE MANAGEMENT OF A FLIGHT WITH A VIEW TO ADHERING TO A TIME CONSTRAINT

(75) Inventors: François Coulmeau, Seilh (FR); Xavier Blanchon, Toulouse (FR); Philippe Chaix, Tournefeuille (FR)

(73) Assignee: Thales, Neuilly sur Seine (FR)

( * ) Notice: Subject to any disclaimer, the term of this patent is extended or adjusted under 35 U.S.C. 154(b) by 180 days.

(21) Appl. No.: 12/870,683

(22) Filed: Aug. 27, 2010

(65) Prior Publication Data
US 2011/0077859 A1     Mar. 31, 2011

(30) Foreign Application Priority Data
Aug. 28, 2009 (FR) ..................................... 09 04106

(51) Int. Cl.
    *G01C 21/00*     (2006.01)
    *G01C 21/34*     (2006.01)
    *G08G 1/123*     (2006.01)

(52) U.S. Cl.
    USPC .......................................... 701/465; 701/423

(58) Field of Classification Search
    USPC .................................................. 701/423, 465
    See application file for complete search history.

(56) References Cited

U.S. PATENT DOCUMENTS

| | | | |
|---|---|---|---|
| 5,121,325 A | 6/1992 | DeJonge | |
| 6,507,782 B1 * | 1/2003 | Rumbo et al. | ................. 701/121 |
| 2004/0193362 A1 | 9/2004 | Baiada et al. | |
| 2007/0100538 A1 | 5/2007 | Wise et al. | |
| 2008/0103646 A1 * | 5/2008 | Lucas et al. | ...................... 701/14 |
| 2009/0112454 A1 * | 4/2009 | Wachenheim et al. | ........ 701/121 |
| 2011/0029158 A1 * | 2/2011 | Klooster | ............................ 701/3 |

FOREIGN PATENT DOCUMENTS

FR     2 913 780     9/2008

OTHER PUBLICATIONS

Search Report, issued on Mar. 22, 2010, for 0904106, filed on Aug. 28, 2009.

* cited by examiner

*Primary Examiner* — Imran Mustafa
(74) *Attorney, Agent, or Firm* — Stroock & Stroock & Lavan LLP

(57) ABSTRACT

A method of flight management of an aircraft aimed at reaching a constrained point on a predetermined lateral trajectory assumed to be followed by the aircraft, at a required time of arrival RTA to within an absolute tolerance. The method including calculating a flight plan to be followed and a homing flight plan and when the estimated time of arrival ETA based on the homing flight plan strays from an absolute tolerance with respect to the calculation required time of arrival RTAc, calculating a new calculation required time of arrival NRTAc dependent on the calculation required time of arrival RTAc and a function f of the difference between the calculation required time of arrival RTAc and the estimated time of arrival ETA, and replacing the calculation required time of arrival RTAc with the new calculation required time of arrival NRTAc, before recalculating a flight plan to be followed.

7 Claims, 2 Drawing Sheets

METHOD FOR AIDING THE MANAGEMENT OF A FLIGHT WITH A VIEW TO ADHERING TO A TIME CONSTRAINT

CROSS-REFERENCE TO PRIOR APPLICATIONS

The application claims priority to French Patent Application No. 0904106, filed on Aug. 28, 2009, which is incorporated by reference herein in its entirety.

FIELD OF THE INVENTION

The invention relates to the field of civil aeronautics and pertains to aircraft flight management systems. More precisely, the invention relates to a method for aiding the management of a flight with a view to adhering to a time constraint. Today, all civilian aircraft are equipped with flight management systems, better known by the acronym FMS. An FMS includes various functional constituents which allow the crew of an aircraft to programme a flight with the help of a navigation database. The flight plan to be followed is the flight plan which is assumed to have to be followed by the aircraft with predetermined tolerances. It includes a vertical trajectory to be followed and a lateral trajectory to be followed (which correspond respectively to the trajectory to be followed in the vertical plane and in the horizontal plane) and a speed profile to be followed (which is in reality the set of values of the component of the speed to be followed in the horizontal plane), assumed to have to be followed by the aircraft with respective tolerances, allowing the aircraft to link up with its destination. The calculations of the flight plans are based on the characteristics of the aircraft, on the data provided by the crew and on the environment of the system. The positioning and guidance functions then collaborate with a view to allowing the aircraft to remain on the trajectories defined by the FMS. The trajectories to be followed are constructed on the basis of a trajectory skeleton formed of a succession of waypoints associated with various flight directives such as directives for altitude, speed, heading etc. A trajectory is constructed on the basis of a chain of segments or curves connecting the waypoints pairwise from the departure point to the destination point. The speed profile to be followed is a curve representing the evolution of the speed assumed to have to be followed by the aircraft, the guidance module included in the FMS having a priori the job of determining, at any instant of the flight, a guidance directive including a set of controls for the aerodynamic equipment of the aircraft so that the latter follows the speed profile, that is to say so that at each instant the speed of the aircraft has the speed determined by the profile.

An aspect of the invention improves the capabilities of the aircraft with a view to allowing them to reach particular points at a required time, with a maximum of precision. This ensues from the continuous increase in air traffic and the corresponding workload for air traffic controllers. Thus, for reasons of safety, but also of economic viability, it becomes indispensable to impose time constraints on aircraft, notably in the descent phase and approach phase succeeding the descent. Aircraft are thus asked to reach a particular waypoint, termed the constrained point, of their flight plan at a required time. These particular points can be a landing runway threshold, a point of convergence of aircraft flows, crossover points that are particularly frequented, etc. This may make it possible, for example, to smooth the flow of aircraft before the approach phase.

BACKGROUND

Today, the FMS calculates a flight plan to be followed which reaches particular points of the flight plan at precise times, in the most effective possible manner and, for example, in an economical manner. The flight plan to be followed is calculated so as to comply with a required time of arrival at a constrained point (that is to say so that the aircraft reaches the constrained point at the required time of arrival), which time is commonly referred to by the acronym RTA for "Required Time at Arrival".

Currently, the FMS of an aircraft regularly verifies whether the aircraft is following the flight plan to be followed. When at a current position on the lateral trajectory, the aircraft strays from the flight plan to be followed (that is to say strays from the predetermined tolerances in the vertical flight plane or in the speed profile with respect to the respective trajectories in these planes), the FMS calculates a new flight plan, called the homing flight plan, assumed to have to be followed by the aircraft that has left the flight plan to be followed, homing in on the flight plan to be followed. The homing flight plan includes an estimated lateral trajectory, an estimated vertical trajectory and an estimated speed profile. Homing in on the flight plan to be followed is understood to mean that the estimated vertical trajectory, the estimated lateral trajectory and the estimated speed profile approach respectively the vertical and lateral trajectories to be followed and the speed profile of the flight plan to be followed until they have been homed in on. The homing flight plan is calculated by prediction on the basis of a current position of the aircraft. When the aircraft is assumed to follow a predetermined lateral trajectory, the homing flight plan includes an estimated speed profile, an estimated vertical trajectory and the lateral trajectory. The speed profile to be followed is the horizontal component of the speed to be followed. When the estimated speed profile links up with the speed profile to be followed, it is therefore the horizontal component of the estimated speed which approaches the speed profile. In aeronautics, the quantities used to define the speed profile are the CAS (Calibrated Air Speed, corresponding to the speed read on the onboard instruments) and the MACH (corresponding to the Mach number). The "horizontal component of the speed to be followed" (hereinafter called the "speed profile to be followed") therefore corresponds to one of these quantities. Hereinafter, the component of the speed of the aeroplane in the horizontal plane, expressed in the units of these quantities CAS or MACH, will be called the "horizontal speed". The homing flight plan is obtained by integrating the state vector of the aircraft, from a current position P of the aircraft, along the forthcoming lateral trajectory (that is to say at constant lateral trajectory) as a function of a homing guidance directive.

A prediction calculation performed so as to home in on the flight plan to be followed corresponds to integrating the state of the aeroplane (according to equation 1 below) on the basis of a guidance directive, called the homing guidance directive, adapted so that the aircraft homes in on the flight plan to be followed. Indeed, the state X of the aeroplane is conventionally related to the guidance directive U by the following equation:

$$dX/dt = f(X,U) \qquad (1)$$

where dX/dt is the derivative of the state of the aircraft with respect to time.

The state of the aircraft is a vector conventionally including the following coordinates: the position of the aircraft in the horizontal plane, its altitude, its ground speed (or speed of the aircraft with respect to the ground), its vertical speed, the air speed (or speed in the air mass), the fuel, the time. The ground speed is equal to the air speed to which is added the wind (the whole in vector form, projected onto the horizontal plane).

The speed of the aircraft is the vector composed of the vertical speed and of the ground speed of the aircraft, in vector form.

Represented in FIGS. 1a and respectively 1b on a descent and approach phase between a departure point PD and an arrival point PA situated at a distance da from the departure, are examples of curves of variation of the altitude and respectively of the horizontal speed of an aircraft as a function of the distance traveled along the lateral trajectory. The curves represented solid in FIGS. 1a, respectively 1b, represent the vertical trajectory to be followed PH and the speed profile to be followed PV. The curves represented dashed in FIGS. 1a and respectively 1b represent an estimated vertical trajectory PHE and respectively an estimated speed profile PVE. In FIGS. 1a and 1b, it is noted that at the current point P situated a distance dP from the start of the descent phase on the lateral trajectory, the aircraft exhibits a current horizontal speed V and current altitude H. In FIG. 1a, the current altitude is greater than the altitude h defined by the vertical trajectory to be followed PH at the current point. The altitude difference DH is greater, in absolute value, than a predetermined altitude tolerance TH, not represented.

The state of the aircraft is integrated as homing guidance directive function including between the current point P and a linkup point in terms of horizontal speed RV situated a distance dv from departure, a linkup guidance directive. More particularly between the current point P and a first point P1 situated a distance d1 from departure, a linkup guidance directive of the type "acceleration under slowed thrust" chosen so that the slope FPA (not represented) formed between the aircraft and the ground is greater than that which is defined by the vertical trajectory to be followed so as to allow the aircraft to approach the vertical trajectory to be followed. Between the current point and the point P1, the estimated horizontal speed of the aircraft increases (and is greater than the horizontal speed of the speed profile to be followed). Once the estimated vertical trajectory is sufficiently close to the vertical trajectory to be followed, here at the point P1, the FMS integrates the state of the aircraft as a function of a linkup guidance directive of the slowdown type, so that the estimated vertical trajectory links up with the trajectory to be followed (at the altitude linkup point RH situated a distance dh from departure) and the estimated speed links up with the speed to be followed (at the speed linkup point RV). For a conventional aircraft where the vector U of guidance directives includes two components, namely the attitude of the aeroplane (or slope FPA) and the thrust of the engines, it is possible to use the attitude to accelerate (increase the thrust) or slow down (decrease the attitude). The estimated vertical trajectory PHE includes an estimated vertical linkup trajectory PHElnk extending between the current point and the altitude linkup point RH, followed by an estimated vertical follow trajectory PHEfollow coinciding, to within a tolerance, with the vertical trajectory to be followed. The estimated speed profile PVE includes an estimated linkup profile PVElnk extending between the current point and the speed linkup point RV, followed by an estimated follow speed profile PVE follow coinciding, to within a tolerance, with the speed profile to be followed.

As soon as the estimated vertical speed profile and the estimated vertical trajectory have linked up with the speed profile to be followed and respectively the vertical trajectory to be followed, that is to say between the speed linkup point RV and the arrival point PA situated at a distance da from departure, the FMS integrates the state of the aircraft along the flight plan to be followed. Everything happens as if the FMS integrated the state of the aircraft according to a guidance directive called the follow guidance directive adapted so that the estimated speed profile and the estimated vertical trajectory are equal to within the respective tolerances, to the speed profile to be followed and to the vertical trajectory to be followed. Stated otherwise, after the respective homing points, the estimated profiles and trajectories follow respectively the profiles and trajectories to be followed. The homing guidance directive therefore includes a linkup guidance directive followed by a follow guidance directive.

The FMS calculates the estimated time of arrival at the constrained point, namely the time at which the FMS forecasts that the aircraft will reach the constrained point. The estimated time of arrival is commonly referred to by the acronym ETA. It is conventionally calculated by integrating the state vector X of the aircraft as a function of the homing guidance directive over the forthcoming lateral trajectory. If the estimated time of arrival strays from a predetermined tolerance, called the absolute tolerance T, with respect to the required time of arrival RTA, a new cycle of calculations takes place, leading the FMS to redefine the flight plan to be followed by taking account of the time constraint to be complied with and a homing flight plan when the aircraft strays from the flight plan to be followed. The objective is to cause the estimated time of arrival calculated on the basis of the guidance directive to converge on the required time of arrival. The tolerance in relation to the required time of arrival is generally modelled in the form of a funnel, that is to say it is increasingly narrow as the aircraft approaches the constraint point. For the calculation of the homing flight plan in the case where the aircraft follows a predetermined lateral trajectory, the FMS has only two degrees of freedom, namely the thrust and the attitude, to define the homing guidance directives ensuring the homing of the flight plan to be followed. Thus the guidance directive acts on the speed of the aircraft.

The time of passage at a determined point (or time profile) being a consequence of the speed profile, each time that the aircraft leaves the vertical trajectory to be followed, the guidance directive determined by the guidance module acting on the horizontal speed of the aircraft gives rise to a failure to adhere to the time constraint. A divergent infinite loop then occurs in the iteration process described previously, generally leading to non-compliance with the time constraint but possibly also having a negative impact on the adherence to the altitude and speed profiles to be followed.

Operationally, the pilot notes that immediately after the calculation of a flight plan to be followed the aircraft complies with the time constraint but that after the determination of a guidance directive bringing the aircraft back onto the flight plan to be followed, the aeroplane begins to deviate temporally from the time constraint. After a certain time, the estimated time of arrival differs from the required time of arrival and a new calculation of the speed profile and of the vertical trajectory to be followed takes place so as to attempt to comply with this time constraint, entailing the calculation of a new guidance directive, differing from the previous one. From the guidance point of view, this brings about jumps, engine jerks if the guidance directives for ensuring linkup change from one loop to another. The aeroplane guidance not succeeding in stabilizing on a guidance directive which complies with the constraint, the flight management system is not reliable. The crew tend to terminate their manoeuvre manually. Moreover, the changes of guidance directive are uncomfortable for the passengers. The instability of the status of the time constraint (which passes from the 'successful' state to the missed state in each iteration) is also counter-productive in relation to the air traffic control authorities which are generally the originators of the time constraint. They note that the aeroplane no longer complies with a time constraint and they may therefore make a needless, or indeed counter-productive decision to manage the guidance of the aircraft.

SUMMARY

An aspect of the present invention is to alleviate the afore drawbacks by proposing a method for aiding the management of the flight of an aircraft, making it possible to favour adherence to a time constraint.

For this purpose, an embodiment of the invention provides a method for aiding the flight management of an aircraft aimed at reaching a constrained point on a predetermined lateral trajectory assumed to be followed by the aircraft, at a required time of arrival RTA to within an absolute tolerance, the method including the following steps:

initialization of a calculation required time of arrival to the required time of arrival,
 calculation of a flight plan to be followed aimed at compliance with the required time of arrival at the constrained point to within an absolute tolerance,
 when the aircraft strays from the flight plan to be followed:
  determination of the homing flight plan homing in on the flight plan to be followed,
  calculation of an estimated time of arrival at the constrained point on the basis of the homing flight plan,
  calculation of a difference in time of arrival between the estimated time of arrival and the calculation required time of arrival,
  comparison between the difference in time of arrival and the absolute tolerance and when the difference in time of arrival strays from the absolute tolerance the method furthermore includes the following steps:
 calculation of a new calculation required time of arrival NRTAc dependent on the calculation required time of arrival RTAc and a function f dependent on the difference between the calculation required time of arrival RTAc and the estimated time of arrival ETA, the new calculation required time of arrival NRTAc being given by the following formula: NRTAc=f(RTAc−ETA)+RTAc,
 replacement of the calculation required time of arrival RTAc with the new calculation required time of arrival NRTAc,
 return to the step of calculating a flight plan to be followed.

The method according to an embodiment of the invention advantageously includes at least one of the following characteristics:

the function f is a gain multiplied by the difference between the calculation required time of arrival and the estimated time of arrival ETA, the gain being a real number,
 the function f depends on the difference between the calculation required time of arrival and the estimated time of arrival is given by the following formula as a function of a first gain and of a second gain which are real numbers:

$$f(RTAc - ETA) = k1 * (RTAc - ETA) + k2 \frac{d(RTAc - ETA)}{dt}$$

the function f depends on the guidance directive and/or optionally on the time discrepancy between the time of arrival at the altitude linkup point on the vertical trajectory to be followed and on the estimated time of arrival at this same point,
 the step of detecting a possible discrepancy between the aircraft, situated at a current instant at a current altitude with a current horizontal speed, and the flight plan to be followed including a vertical trajectory to be followed, a lateral trajectory to be followed and a speed profile to be followed, includes the following steps:
  a step of calculating the altitude difference between the current altitude and the altitude defined by the vertical profile to be followed at the current point and/or the speed difference between the current horizontal speed and the horizontal speed defined by the speed profile to be followed,
  a step of comparing the altitude difference with an altitude tolerance and/or the speed difference with a speed tolerance,
 prior to the step of calculating a new calculation required time of arrival, it includes a step of modifying a first and/or a second optimization criterion satisfied respectively by the flight plan to be followed and the homing flight plan,
 it includes, after the step of calculating a homing flight plan, a step of verifying a condition of passage to the step of calculating the estimated time of arrival.

An embodiment of the invention also provides a system for aiding flight management able to implement the method according to the invention.

The method according to an embodiment of the invention makes it possible when an aircraft deviates from a flight plan to be followed, at one and the same time to establish a guidance directive which allows the aircraft to link up with the flight plan to be followed and to comply with a time constraint. The reliability of the FMS in terms of flight management is thus improved. The improvements with respect to the current situation are concerned with decreasing the workload of air traffic controllers on account of the reduction in the rate of missed time constraints.

BRIEF DESCRIPTION OF THE DRAWINGS

Other characteristics and advantages of the invention will become apparent on reading the detailed description which follows, given by way of nonlimiting example and with reference to the appended drawings in which.

From one figure to another, the same elements are labelled by the same references.

DETAILED DESCRIPTION

An embodiment of the invention provides a method of flight management of an aircraft by complying with a time constraint, intended to be implemented in the descent phase or in the approach phase.

Figure 1B:
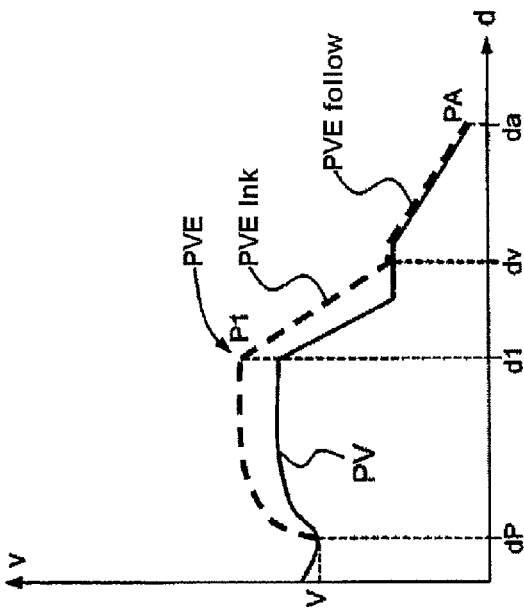
FIGS. 1a and respectively 1b, represent in a descent and approach phase, examples of curves of variation of the altitude and respectively of the vertical speed of an aircraft as a function of the distance traveled along the lateral trajectory as well as an estimated vertical trajectory and an estimated vertical speed profile of a homing flight plan, FIG. 2 schematically represents the steps of the flight management method according to an embodiment of the invention aimed at complying with a time constraint at a constrained point.
Figure 1A:
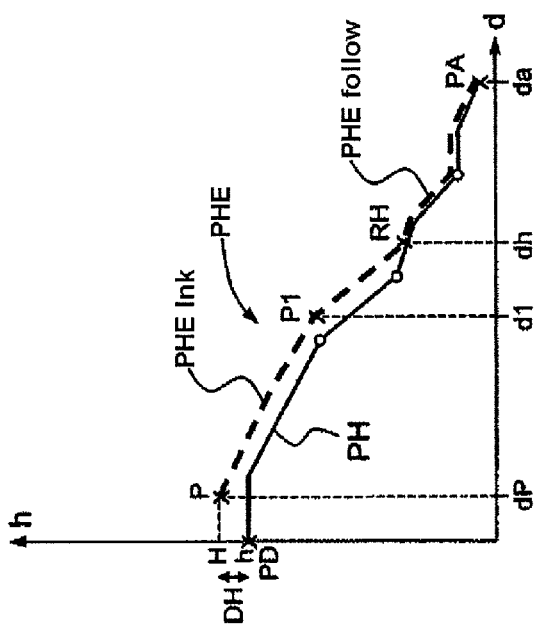
Figure 2:
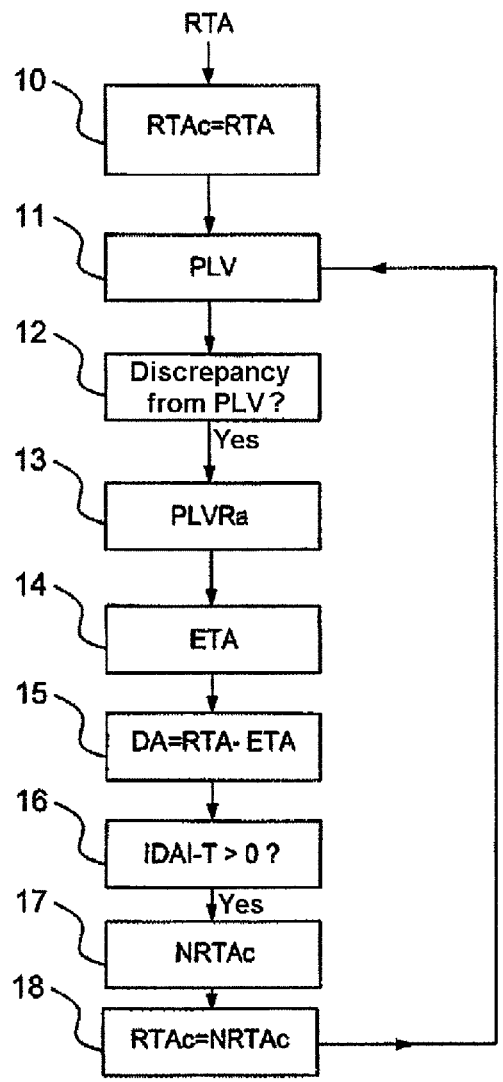

Schematically represented in FIG. 2 are the steps of the flight management method according to an embodiment of the invention aimed at complying with a time constraint RTA at a constrained point PC exhibiting a coordinate pc on the ground. The aircraft is, as we saw previously, represented by a state vector X. The method according to a first embodiment of the invention conventionally includes:
- a step 10 of initializing a calculation required time of arrival RTAc at a constrained point PC to the required time of arrival RTA at a constrained point Pc,
- a step 11 of calculating a flight plan to be followed PVL assumed to be followed by the aircraft. The flight plan to be followed is aimed at compliance with the calculation required time of arrival RTAc at the constrained point PC to within an absolute tolerance T. The flight plan to be followed includes a vertical trajectory to be followed PH in the vertical plane, a lateral trajectory to be followed PL in the horizontal plane and a speed profile to be followed PV. The speed profile to be followed is conventionally calculated so as to satisfy a first criterion. The first criterion includes for example in limiting the speed profile to a CAS/MACH pair for the phase including the descent and the linkup, the CAS/MACH pair being taken in a space delimited by an envelope of speeds that the aircraft can physically adopt. The CAS and the MACH are a function of a first criterion of economic optimization termed Cost Index, of the weight of the aircraft, of the altitude and of the temperature. The cost index is in fact a criterion of optimization between the temporal costs CT ("Cost of Time") and the costs of petroleum CF ("Cost of Fuel"). The cost index is defined by CI=CT/CF. The first criterion can include in fixing the cost index for the descent and approach phases or solely in constraining the speed profile to be in a predetermined envelope of speeds delimiting the speeds between a lower curve and an upper curve. As a variant, the first criterion includes in taking other costs into account, such as nuisance costs (noise, polluting emissions, etc.) The speed envelope encompasses the speeds that the aircraft can physically follow.

The method according to an embodiment of the invention furthermore includes:
- a step 12 of detecting a possible discrepancy between the aircraft, at a given instant, and the flight plan to be followed PVaS that the aircraft is assumed to follow,
- when there exists a discrepancy between the aircraft and the flight plan to be followed, a step 13 of calculating a homing flight plan PVRa, homing in on the flight plan to be followed, the homing flight plan including an estimated vertical trajectory and an estimated speed profile. When no discrepancy exists the aircraft continues to follow the flight plan to be followed which is the active flight plan.

The calculation of homing flight plan PLVRa is conventionally calculated by prediction by integrating the state of the aircraft from the current point by means of a homing guidance directive including a linkup guidance directive and a follow guidance directive, as described previously. The homing flight plan is the flight plan assumed to have to be followed by the aircraft having left the flight plan to be followed. The FMS conventionally chooses linkup guidance directives from among linkup guidance directives predetermined by the aircraft manufacturer acting on the thrust and the attitude of the aircraft. These are for example directives of the SPD/THR type when the aircraft is above the profile or in overspeed and directives of the VS/SPD or FPA/SPD type when the aircraft is below the altitude profile. Other modes of guidance are possible as a function of the type of aircraft and of the constructor. If 2 available controls are the attitude and the thrust, then the SPD/THR mode is a mode of guidance where the horizontal speed (SPD for Speed) is slaved by using the attitude of the aircraft, and where the engine thrust (THR for Thrust) is pegged. The vertical evolution of the craft is therefore a consequence and not a directive in this case. The VS/SPD mode is a mode of guidance where the vertical speed (VS for Vertical Speed) is slaved by using the attitude of the aircraft, and where the horizontal speed (SPD) is slaved by modulating the engine thrust. The FPA/SPD mode is a mode of guidance where the ground slope of the aircraft (FPS for Flight Path angle) is slaved using the attitude of the aircraft, and where the horizontal speed (SPD) is slaved by modulating the engine thrust.

The linkup guidance directive is preferably chosen so that the estimated speed profile satisfies a second optimization criterion. The second optimization criterion is for example a cost index aimed at fixing a CAS/MACH pair satisfied by the speed during the linkup phase. The CAS/MACH pair preferably induces speeds lying within the predetermined speed envelope, that the aircraft is physically capable of adopting. As a variant, the guidance directive for which the flight plan to be followed can be homed in on fastest is determined.

At a given instant, the aircraft occupies a current position P situated a distance dP from the start of the descent phase on the lateral trajectory, the aircraft exhibits a current horizontal speed V and current altitude of the aircraft H. In the method according to the invention, the aircraft does not deviate from the lateral trajectory to be followed.

When the aircraft follows a predetermined lateral trajectory, the step, not represented, of detecting a possible discrepancy between the aircraft and the flight plan to be followed conventionally includes the following steps:
- a step of calculating, at the given instant, the difference in altitude DH between the current altitude H and the altitude defined by the vertical profile to be followed PH at the current point and/or the difference in speed DV between the current horizontal speed V and the horizontal speed defined by the speed profile to be followed PV at the current point.
- a step of comparing the altitude difference DH with an altitude tolerance TH and/or the speed difference DV with a speed tolerance TV.

The aircraft is assumed to be off the flight plan if the altitude difference DH strays from the altitude tolerance TH and/or the speed difference DV strays from the speed tolerance TV.

The method according to an embodiment of the invention also includes, when the aircraft strays from the flight plan to be followed, the following steps:
- calculation 14 of an estimated time of arrival ETA at the constrained point PC on the basis of the homing flight plan PLVRa,
- calculation 15 of a difference in time of arrival DA between the estimated time of arrival ETA and the calculation required time of arrival RTAc,
- comparison 16 between the arrival difference DA and the absolute tolerance T.

A value strays from the absolute tolerance when its absolute value is greater than the absolute tolerance. The estimated time of arrival ETA is conventionally calculated, as described previously, by means of a prediction calculation including in integrating the state of the aircraft as a function of the homing guidance directive over the lateral trajectory to be followed. When the estimated time of arrival does not stray from the absolute tolerance, the aircraft follows the homing flight plan.

By updating the calculation required time of arrival before each loop for calculating a flight plan to be followed and a homing flight plan, the estimated time of arrival converges towards the required time of arrival. Stated otherwise, the flight management method makes it possible to calculate a homing flight plan which satisfies the time constraint.

When the required time of arrival does not stray from the absolute tolerance, the aircraft continues to follow the homing flight plan.

The flight management method according to an embodiment of the invention thus includes, when the difference in time of arrival DA strays from the absolute tolerance T, the following steps:

calculation 17 of a new calculation required time of arrival NRTAc dependent on the calculation required time of arrival RTAc and a function f of the difference between the calculation required time of arrival RTAc and the estimated time of arrival ETA, the new calculation required time of arrival NRTAc being given by the following formula:

$$NRTAc = f(RTAc - ETA) + RTAc,$$

replacement 18 of the calculation required time of arrival RTAc with the new calculation required time of arrival NRTAc, and return to the step of calculating the flight plan to be followed.

The function f is for example a gain k multiplied by the difference between the calculation time of arrival and the estimated time of arrival ETA. The gain k is a real number whose value can be adjusted according to the conventional techniques of the engineer in the science of Automation. The value of the gain is adjusted so as to balance the speed of convergence of the loop with respect to possible instabilities.

As a variant, the function f is of the type:

$$f(RTAc - ETA) = k1 * (RTAc - ETA) + k2 \frac{d(RTAc - ETA)}{dt}$$

where a first gain k1 and a second gain k2 are real numbers whose values are adjusted by automation techniques so as to ensure satisfactory convergence and satisfactory stability.

$$\frac{d(RTAc - ETA)}{dt}$$

is the derivative with respect to time of the difference between the calculation required time of arrival RTAc and the estimated time of arrival ETA.

The function f could furthermore depend on the guidance directive and/or optionally on the temporal discrepancy between the time of arrival at the altitude linkup point on the vertical trajectory to be followed and on the estimated time of arrival at this same point.

The estimated time of arrival is calculated by means of a prediction calculation including in integrating the state of the aeroplane X as a function of the guidance directive.

The method optionally includes, after the step of calculating a homing flight plan, a step, not represented in FIG. 2, of verifying compliance with a condition of passage to step 14 for calculating the estimated time of arrival. This step includes in verifying whether the physical limits of the aircraft have been reached. When they have been reached, we do not pass to step 14. When they have not been reached, the estimated time of arrival is calculated. The physical limits of the aircraft are reached if, for example, the speed profile estimated on the basis of the homing guidance directive lies on the predetermined speed envelope (for example if the speed of the speed profile lies on the upper limit of the envelope while the difference in time of arrival is negative). Other physical limits can be taken into account such as for example a maximum allowable load factor (acceleration in the vertical plane) guaranteeing passenger comfort for example.

As a variant, the method includes prior to the return to step 11 of calculating a flight plan to be followed, a step of modifying the first and/or the second optimization criterion.

An embodiment of the invention also relates to a flight management system including means for implementing the method according to the invention.

The present invention is not limited to the embodiments described herein, reference should be had to the appended claims.

The invention claimed is:

1. A method for aiding a flight management of an aircraft aimed at reaching a constrained point on a predetermined lateral trajectory, at a required time of arrival RTA to within an absolute tolerance, said method comprising the following steps:
   utilizing a processor to initialize a calculation required time of arrival RTAc to the required time of arrival RTA, and then causing the processor to iterate the following steps:
   calculating a flight plan to be followed aimed at compliance with said calculation required time of arrival RTAc at the constrained point to within an absolute tolerance, when the aircraft strays from the flight plan to be followed:
      determining a homing flight plan, homing in on the flight plan to be followed,
      calculating an estimated time of arrival ETA at the constrained point on the basis of the homing flight plan,
      calculating a time of arrival difference between the estimated time of arrival ETA and the calculation required time of arrival RTAc,
   comparing the time of arrival difference and the absolute tolerance,
   wherein when the time of arrival difference exceeds the absolute tolerance, performing the following steps:
      calculating a new calculation required time of arrival NRTAc at the constrained point dependent on the calculation required time of arrival RTAc and a function f dependent on the difference between the calculation required time of arrival RTAc and the estimated time of arrival ETA, the new calculation required time of arrival NRTAc being given by the following formula: NRTAc=f(RTAc−ETA)+RTAc, the new calculation required time of arrival NRTAc being different from the calculation required time of arrival RTAc; and
      replacing the calculation required time of arrival RTAc with the new calculation required time of arrival NRTAc.

2. The method for aiding the flight management of an aircraft according to claim 1, wherein the function f is a gain multiplied by the difference between the calculation required time of arrival RTAc and the estimated time of arrival ETA, the gain being a real number.

3. The method for aiding the flight management of an aircraft according to claim 1, wherein the function f further depends on a guidance directive.

4. The method for aiding the flight management of an aircraft according to claim 1, wherein determining whether the aircraft, situated at a current altitude with a current horizontal speed, has strayed from the flight plan to be followed, the flight plan to be followed including a speed profile to be followed and a vertical profile to be followed, includes the following steps:

calculating an altitude difference between the current altitude and an altitude defined by the vertical profile to be followed at least one of the current point and a speed difference between the current horizontal speed and the horizontal speed defined by the speed profile to be followed, and comparing at least one of the altitude difference with an altitude tolerance and the speed difference with a speed tolerance.

5. The method for aiding the flight management of an aircraft according to claim 1, wherein prior to the step of calculating the new calculation required time of arrival NRTAc, a step is performed for modifying at least one of a first and a second optimization criterion satisfied respectively by the flight plan to be followed and the homing flight plan.

6. The method for aiding the flight management of an aircraft according to claim 1, further comprising, after the step of calculating a homing flight plan, a step of verifying a condition of passage to the step of calculating the estimated time of arrival.

7. A system for aiding the flight management of an aircraft aimed at reaching a constrained point on a predetermined lateral trajectory, at a required time of arrival RTA to within an absolute tolerance, the system including a programmed processor and a memory with instructions which cause the processor to:

initialize a calculation required time of arrival RTAc to the required time of arrival RTA, and iteratively perform the following steps:

calculate a flight plan to be followed aimed at compliance with said calculation required time of arrival RTAc at the constrained point to within an absolute tolerance, when the aircraft strays from the flight plan to be followed:
determine a homing flight plan, homing in on the flight plan to be followed,
calculate an estimated time of arrival ETA at the constrained point on the basis of the homing flight plan,
calculate a difference in time of arrival between the estimated time of arrival ETA and the calculation required time of arrival RTAc,
compare the difference and the absolute tolerance,
wherein when the difference exceeds the absolute tolerance, the the following steps are performed:
calculate a new calculation required time of arrival NRTAc dependent on the calculation required time of arrival RTAc and a function f dependent on the difference between the calculation required time of arrival RTAc and the estimated time of arrival ETA, the new calculation required time of arrival NRTAc being given by the following formula:

$$NRTAc = f(RTAc - ETA) + RTAc, \text{ and}$$

replace the calculation required time of arrival RTAc with the new calculation required time of arrival NRTAc.

* * * * *